United States Patent

[11] 3,615,195

[72] Inventors Laurence W. Bierman, Jr.;
Jerry L. May, both of Pocatello, Idaho
[21] Appl. No. 812,497
[22] Filed Dec. 11, 1968
[45] Patented Oct. 26, 1971
[73] Assignee J. R. Simplot Company
Boise, Idaho

[54] FLUOSILIC ACID RECOVERY
8 Claims, 3 Drawing Figs.
[52] U.S. Cl. ................................................ 23/165,
23/153, 23/205
[51] Int. Cl. ..................................................... C01b 25/22
[50] Field of Search ........................................... 23/153,
165, 165 B, 205

[56] References Cited
UNITED STATES PATENTS
2,049,032  7/1936  Weber et al. ................. 23/165
2,807,521  9/1957  Lambe et al. ................. 23/165
3,074,780  1/1963  Smalter ......................... 23/165
OTHER REFERENCES
Flourine Control and Recovery, D. D. Morris, B. P. Sutherland & C. H. Wright, Canadian Chemistry and Metallurgy, August 1937 p. 271– 274

Primary Examiner—Oscar R. Vertiz
Assistant Examiner—Gregory A. Heller
Attorney—Jones and Lockwood ABSTRACT: This disclosure is concerned with a process whereby fluorine values in the form of fluosilicic acid may be effectively and economically recovered from dilute phosphoric acid wash solutions obtained in the manufacture of phosphoric acid by the wet-process.

FIG. I

INVENTORS
L. W. BIERMAN, JR.
J. L. MAY

FLUOSILIC ACID RECOVERY

This invention is concerned with a process for the removal of fluoride impurities from dilute solutions of phosphoric acid. More particularly, this invention is concerned with a process whereby the fluoride values may be easily and economically removed from dilute phosphoric acid wash solutions obtained when phosphoric acid is produced by the acidic decomposition of phosphate ore having fluoride impurities associated with it. In the acidic decomposition of phosphate ore, the principal products obtained are phosphoric acid and an insoluble calcium salt of the acid used in the decomposition. This insoluble calcium salt byproduct is commonly washed with an aqueous washing liquor to remove adhering phosphoric acid. The so obtained dilute phosphoric acid wash solutions are then returned to the main reactor-digestors to recover the phosphate values. In the majority of commercial processes the standard acid used for this decomposition is sulfuric acid and this method of producing phosphoric aid is commonly called the wet-process.

The phosphate ore, which is reacted with sulfuric acid to produce wet-process phosphoric acid and calcium sulfate (byproduct gypsum), normally consists of a fluorapatite [$Ca_{10}(PO)_6F_2$] or a related mineral in association with various rocks. A simplified equation for the major reaction which occurs during the digestion and reaction of the phosphate ore with sulfuric acid is as follows:

$$Ca_5F(PO_4)_3 + 5H_2SO_4 + 6H_2O \rightarrow 5CaSO_4 \cdot 2H_2O + 3H_3PO_4 + HF$$

This major reaction is the total of a series of intermediate reactions and the wet-process is more accurately characterized by the following:

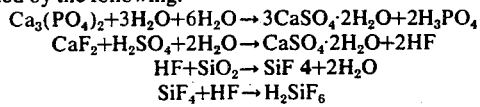

As the above series of equations indicate considerable fluorine is freed during the process and will be found in various forms throughout the reaction mixture. Some will be evolved as hydrogen fluoride and/or silicon tetrafluoride during the initial reaction period, while other amounts will be found in the reaction products in the form of dissolved hydrogen fluoride, fluosilicic acid, and ionic salts of these acids.

In the usual method of the wet-process the calcium sulfate (gypsum) byproduct is first filtered from the product phosphoric acid and then is washed countercurrently with water in a multiplicity of stages to remove and recover additional phosphoric acid. The more concentrated wash solution is usually called the No. 2 Filtrate, and generally contains from about 15 to 25 percent $P_2O_5$, although the filtrate may be stronger or weaker depending upon the exact process used. This acidic wash solution is returned to the main reactor-digestors to increase its concentration to product grade acid, and, hence, recover the $P_2O_5$ values. During the course of the washings of the various calcium sulfate solids, the wash solution will solubilize fluoride impurities associated with the solids to the extent that the more concentrated wash solution, i.e., No. 2 Filtrate, will have a fluoride concentration in the range of from about 0.5 to 0.5 percent.

According to the process of the present invention, the fluoride containing dilute phosphoric acid wash solution may be defluorinated and the fluoride value recovered to provide an additional product of economic importance. Thus, it has been found that, if prior to the return of the dilute phosphoric acid process, a critical amount of this solution is mixed, under the proper reaction condition, with the main charge of sulfuric acid, prior to its reaction with the phosphate ore, the fluoride values of the wash solution are liberated. These fluoride values are then separated under the proper conditions from the reaction mixture, and recovered by the proper method. The defluorinated mixture of sulfuric acid and acidic washing solution is then returned to the main process with essentially no loss of these materials a nd with no modification of the main process necessary.

In the prior art, numerous methods have been proposed to recover fluoride values from various steps of the manufacturing process for phosphoric acid. Thus, proposals have been made to recover the fluorine gases given off during the initial digestion, and to increase this amount by blowing an inert gas through this stage, and then recovering the so liberated fluorine values. Numerous processes are known wherein steam or air is blown through the concentrated product phosphoric acid to remove the volatile fluorine impurities. While another proposal has been advanced to use a process somewhat similar to the subject process to recover fluoride values from the phosphoric acid wash solutions. However, this latter process has not proved to be feasible to operate on a large scale in an efficient and economical manner.

Figure 2:
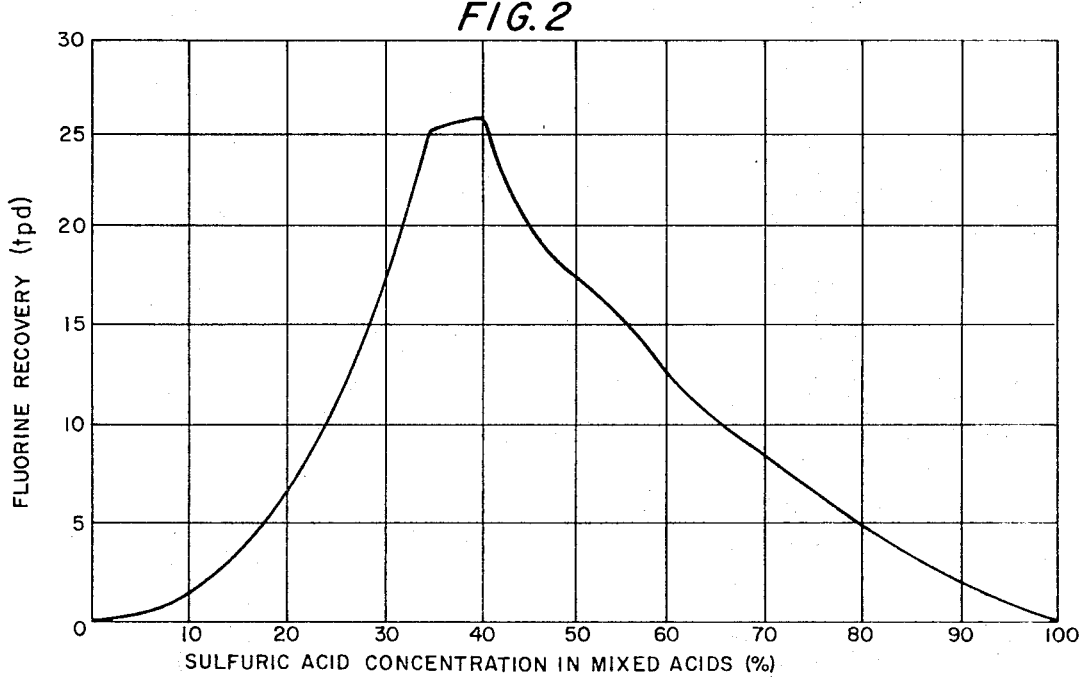
FIG. 2 is a graphic representation of the relationship between fluorine recovery and sulfuric acid concentration in the mixed acids.

Low concentrations of fluorine in the filtrate will, in addition to reducing the total fluorine recovered, also skew the relationship as shown in FIG. 2 to the left so that optimum recoveries begin to occur between 29 and 30 percent $H_2SO_4$ in the mixed acids. The particular Figure shown was based upon 60 percent defluorination of the filtrate with 30 percent $H_2SO_4$ in the mixed acids. This result was accomplished by using a gas/fluid mass flow ratio of 0.68, steam as the stripping gas, liquid temperature of 240° F., fluorine in the No. 2 Filtrate of 1.6 percent, with powdered silica added.

Essentially, the process of the present invention comprises four basic steps which provide for the efficient, economical removal and recovery of the fluoride values from the dilute phosphoric acid wash solution containing fluoride impurities.

In the first step a portion of the wash solution is mixed with the main charge of sulfuric acid, so as to provide a sulfuric acid concentration in the resulting mixed acids in the range of 29 to 45 weight percent. That portion of the wash solution not utilized in this step is returned in any of the conventional ways to the main phosphoric acid process.

In the second step a gas of sufficient amount and velocity is passed through the above acidic mixture under suitable conditions to strip the so-formed volatile fluoride compounds from the mixture. Steam is particularly efficient gas to use in this stripping process.

The third step consists of absorbing the volatilized fluorides formed above, under suitable conditions, in a suitable absorbing medium. In the fourth step the defluorinated mixture of acids is returned to main phosphoric acid process in any of the conventional manners. The details of each of these steps are discussed more fully below.

Figure 1:
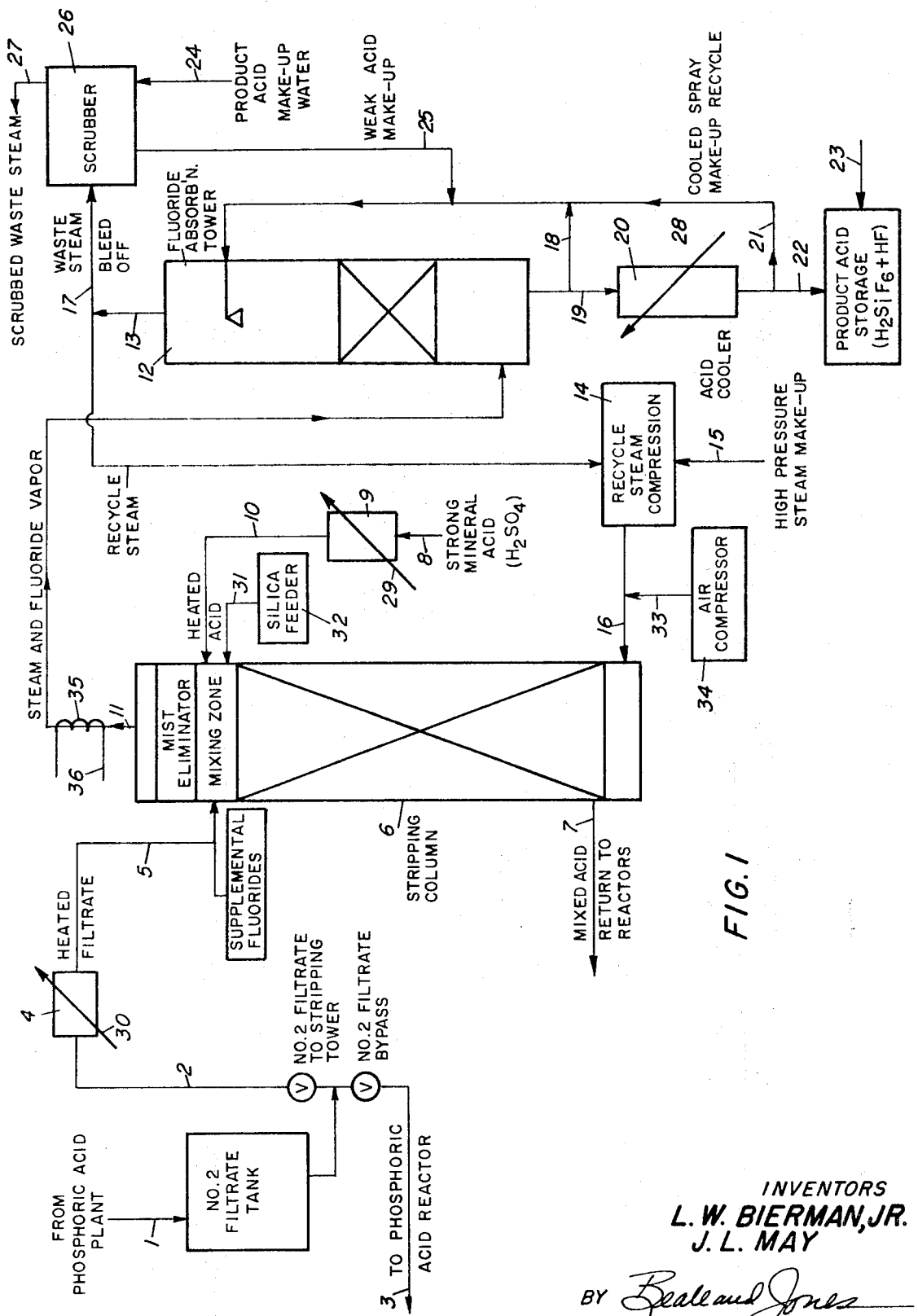
FIG. 1 is a diagrammatic representation of a method of effecting the subject process.

In FIG. 1, there is shown diagrammatically one method presently contemplated by the inventors of carrying out the process of the present invention. The dilute phosphoric acid wash solution, commonly referred to as No. 2 FIltrate 1 enters a small filtrate storage tank, in the phosphoric acid process. The flow of filtrate from this tank is controlled so that a portion 2 is diverted to the defluorination unit in the proper proportion, and the other portion is returned directly to the main phosphoric acid process 3. That portion of the No. 2 Filtrate to be defluorinated is conducted to a heat exchanger 4 in preparation for entry into the stripping tower 6. Normally the filtrate temperature as received from the wet process phosphoric acid plant will be in the range of from 120° to 190° F. Using a source of heat 30, such as steam, hot solutions, etc., the temperature of the filtrate can be raised as needed to provide temperature control in the stripping tower. The strong sulfuric acid 8 to be used in a concentration of 50 percent to fuming, preferably 93 to 100 percent, may also be heated in a similar manner in a heat exchanger 9 using a similar source of heat 29. The hot sulfuric acid 10 and the heated filtrate 5 enter the stripping tower 6 and are mixed in a suitable mixing device.

If desired, a silica feeder 32 may be employed to add acid-soluble silica 31 to the mixed acids. It is, of course, possible to add silica to any of the streams entering the tower to produce the same effect. The amount of silica used will depend upon the operating economics and the desire to minimize the amount of stripping gases used while maintaining acceptably high defluorination efficiency. To increase incremental fluoride production, waste silicofluorides or fluorides 37 may be added either directly to the tower or repulped in a suitable media, i.e., No. 2 Filtrate, and then added.

The stripping gas 16, such as air, steam or a mixture of these, of sufficient pressure and quantity, enter the bottom of the tower and rise through the packed bed. The packings may be of standard commercial design or specially designed for this application. Chief criteria are nonscaling high surface area, and ability to withstand extremely corrosive conditions. If properly applied several high-temperature plastics and ceramics are suitable. Other alternatives include baffle designs, either stationary or agitated.

The mixing of the phosphoric acid wash solution and the strong acid in the top of the tower, immediately releases some fluoride vapor and increases the vapor pressure of the remaining fluorides. As the mixed acids flow down through the tower, the rising gases intimately contact the liquid phase and through a series of stages strip the residual fluoride from the mixed acid solution. The stripped mixed acids 7 are discharged from the tower and returned to the phosphoric acid production process. Since these concepts of a stripping tower operation are familiar to those skilled in the art, they will not be further elaborated.

The fluoride laden gases 11 leave the tower and flow to the absorber 12. A heating coil 35 with a suitable source of heat 36, such as steam or electricity, prevents any significant drop in the temperature of the vapor between the stripping column and the absorber so as to minimize line scaling. The absorber 12 may be of any of the designs in commercial use or may be specifically designed to handle these vapors, wherein the primary fluoride present in $SiF_4$. A design used in some of the work consisted of a lower turbulent flooded zone to strip most of the $SiF_4$ from the vapor and into solution. These gases next rise through a packed bed 12 and a cooled spray of absorbing medium washes them in the bed and above packing before they are finally discharged 13 from the absorption tower.

The fluosilicic acid solution in the absorption tower is partially cooled 18, 19 in a cooler 20 and recycled 21 to increase the $H_2SiF_6$ concentration. Any suitable coolant 28, such as water, air etc., may be used as the cooling media. To minimize equipment costs and improve process economy, the fluosilicic acid cooler has been shown to include product acid cooling 22, to reduce corrosion in storage equipment 23 and reduce fluorine volatilization loss from a hot product acid.

A portion of the vapors from the absorber may be recompressed 14 and make up high-pressure steam 15 added to offset losses and bleedoff. The recycle and recompression of the steam is done to improve the economy of the process and to reduce the required efficiency of the absorption tower. Air, either at ambient temperature or heated, is compressed 34 and added to the steam 33, if it is desired to use a mixed air-steam stripping gas. If air alone is the stripping gas, the air recompression recycle would probably not be desirable. That portion of the steam that is not recycled is bled off 17 to a scrubber 26 of any convenient type to minimize air pollution and recover residual fluorides from the absorber offgas. Fresh water 24 is added to the scrubber and weak fluosilicic acid solution is transferred as make up solution to the absorber to recover the fluoride values, and the water scrubbed vapor 27 is vented to the atmosphere.

FIG. 2 is a graphic representation of fluorine recovery, expressed in tons per day (tpd) plotted against the sulfuric acid concentration, which is expressed as percentage by weight in the mixed acids, i.e., the dilute phosphoric acid wash solution plus strong sulfuric acid. In determining the data forming the basis for the above representation, the other process variables of stripping gas, stripping gas ratio, temperature, amount of sulfuric acid, the fluorine content of the No. 2 Filtrate were kept constant and a specific $P_2O_5$ production rate was assumed. From these data, the dependence of fluorine recovery upon the sulfuric acid concentration in the mixed acid is readily apparent.

Since the amount of sulfuric acid used in the process is essentially constant, and is a function of the amount of phosphate ore charged into the process, for practical purposes the variable is the amount of No. 2 Filtrate that is diverted into the defluorination unit from its direct return to the digestor-reactors of the phosphoric acid process. As is illustrated herein, when too little or too much of the No. 2 Filtrate is diverted to the defluorination unit, i.e., the concentration of sulfuric acid is too great or too small, the amount of fluoride recovery is drastically reduced. Thus, for example with a 60 percent sulfuric acid concentration the fluoride recovery is 12.5 tpd and with a 20 percent sulfuric acid concentration the fluorine recovery is 6.5 tpd. However, in the range of 32 percent to 45 percent sulfuric acid concentration the recovery of fluorine increases to a range of better than 20 tpd, and in the very narrow range of 35 percent to 40.5 percent sulfuric acid, the fluorine recovery increases to 25 tpd.

Thus, for the economical defluorination of the dilute phosphoric acid wash solution, the amount of this solution, i.e., No. 2 Filtrate, that is diverted to the defluorination step must be sufficient to provide a sulfuric acid concentration in the range of from 29 percent to 45 percent in the mixed acids to be defluorinated. For the optimum recovery, this diversion should be in the range to provide a sulfuric acid concentration in the mixed acid of from 31 percent to 40.5 percent, depending upon the fluoride content of the wash filtrate.

Figure 3:
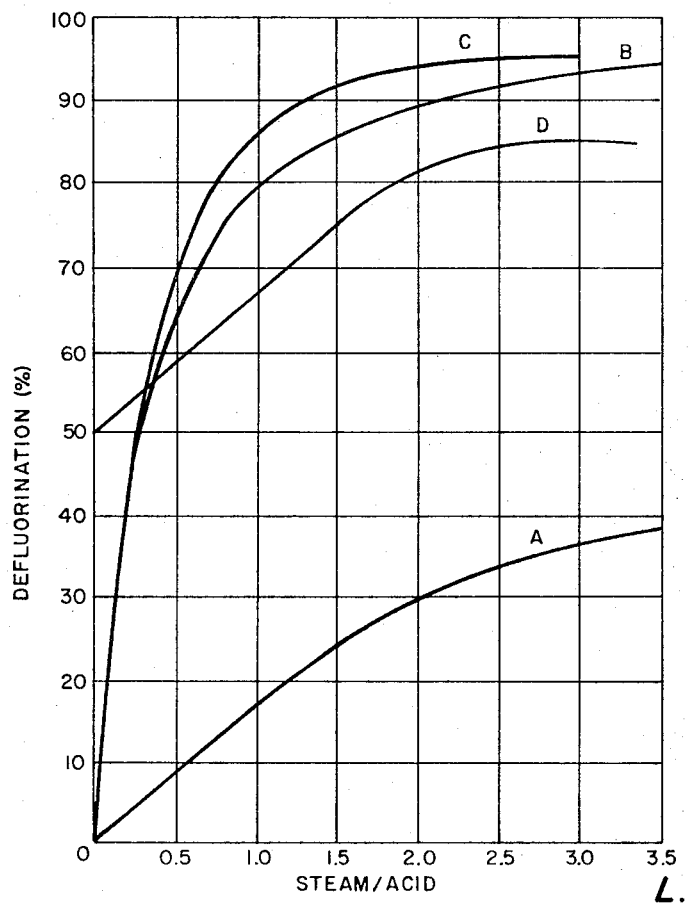
FIG. 3 is a graphic representation of the relationship between percentage defluorination of phosphoric acid solutions of various $P_2O_5$ content and the ratio of pounds of steam per pound of mixed acid, when steam is used as the stripping gas.

FIG. 3 is a graphic representation of the effect of steam stripping to defluorinate crude fluoride containing phosphoric acid solutions of various $P_2O_5$ content. Thus, herein is plotted the percentage of defluorination obtained against the ratio of pounds of steam per pounds of acids, for the various phosphoric acid solutions. Curve A represents the defluorination obtained with a 32% $P_2O_5$ phosphoric acid solution, curve B that is obtained with a solution of 42% $P_2O_5$, and curve C the results with a 52% $P_2O_5$ solution.

A comparison of the three curves A, B and C, which are based upon an incremental increase of 10% $P_2O_5$ content of the phosphoric acid solutions, clearly demonstrate that the percentage of defluorination is a function of the $P_2O_5$ content of the acid solutions, i.e., the more concentrated acid yields a greater percentage of defluorination. The results plotted in curve D are those obtained from a phosphoric acid solution having a 28% $P_2O_5$ content which has been acidified in a ratio of 1.86 parts of phosphoric acid to 1 part of concentrated sulfuric acid, resulting in a mixed acid solution containing 35 percent sulfuric acid.

This data clearly illustrates the unexpected increase in defluorination achieved using steam as a stripping gas and the addition of a small amount of sulfuric acid to the dilute phosphoric acid solutions. For example, comparing curve A (32% $P_2O_5$) with curve D (28% $P_2O_5 +_{mH2}SO_4$), it is to be noted that at a ratio of 1, the defluorination, 32% $P_2O_5$ solution is 17 percent, while for the more dilute $P_2O_5$ solution the defluorination is 66 percent, an increase of about 4 times. Even at higher steam to acid ratios, with the percentage defluorination approaching a constant value, the increase in defluorination is in the range of 2.5 times to 3 times greater, for the more dilute phosphoric acid-acidified solution as compared to the more concentrated unacidified solution.

A clearer understanding of the new process for fluorine recovery from dilute phosphoric acid wash solutions may be obtained from the examples given below, which disclose the presently preferred modes of carrying out this invention.

In the example given below the apparatus and procedure given above in FIG. 1, were used. The dilute phosphoric acid wash solutions were those obtained during the course of normal manufacturing operations of a commercial wet-process phosphoric acid process.

EXAMPLES 1 and 2

| Stream | Variable | Values | |
|---|---|---|---|
| No. 2 Filtrate to Stripper | Temperature | 134° F. | 216° F. |
| | $P_2O_5$ | 18.39% | 25.44% |
| | Flow rate (ml./min.) | 31 | 31 |
| | Fluorine | 1.50% | 1.40% |
| $H_2SO_4$ to Stripper | Temperature | Ambient | Ambient |
| | $H_2SO_4$ | 99.+% | 99.% |
| | Flow rate (ml./min.) | 8.5 | 14.0 |
| Gases Air to Stripper | Flow rate (scfh) | 35.5 | 29.5 |
| | Steam | None | None |
| Fluoride-laden vapors from Stripper | Temperature | 182° F. | 185° F. |
| Spent Acid from Stripper | Flow rate (ml./min.) | 38 | 43 |
| | Sp. Gr. | 1.360 | 1.510 |
| | Temperature | 145° F. | 167° F. |
| | F | 0.67% | 0.41% |
| | $H_2SO_4$ | 30.0% | 38.4% |
| | $P_2O_5$ | 12.86% | 16.04% |
| Defluorination Achieved | | 33% | 58% |

The above examples illustrated the effect of sulfuric acid concentration in the mixed acid on defluorination.

EXAMPLES 3 and 4

| Stream | Variable | Values | |
|---|---|---|---|
| No. 2 Filtrate to Stripper | Temperature | 135° F. | 132° F. |
| | $P_2O_5$ | 23.68% | 18.26% |
| | Flow rate (ml./min.) | 28 | 31 |
| | Fluorine | 1.53% | 1.47% |
| $H_2SO_4$ to Stripper | Temperature | Ambient | Ambient |
| | $H_2SO_4$ | 99.+% | 99.+% |
| | Flow rate (ml./min.) | 19 | 12.5 |
| Stripper Gases to Stripper | Flow rate air (scfh) | 16 | 15 |
| | Steam | None | None |
| Fluoride-laden vapor from Stripper | Temperature | 140° F. | 164° F. |
| Spent acid from Stripper | Flow rate (ml./min.) | 63 | 57 |
| | Sp. Gr. | 1.478 | 1.425 |
| | Temperature | 138 | 158 |
| | F | 0.41% | 0.35% |
| | $H_2SO_4$ | 41.8% | 42.1% |
| | $P_2O_5$ | 15.33% | 11.81% |
| Defluorination Achieved | | 59% | 63% |

These examples demonstrate the effect of reaction temperatures on defluorination.

EXAMPLES 5 and 6

| Stream | Variable | Values | |
|---|---|---|---|
| No. 2 Filtrate to Stripper | Temperature | 128° F. | 127° F. |
| | $P_2O_5$ | 24.25% | 25.44% |
| | Flow (ml./min.) | 31 | 62 |
| | Fluorine | 1.65 | 1.47 |
| $H_2SO_4$ to Stripper | Temperature | Ambient | Ambient |
| | $H_2SO_4$ | 99+% | 99+% |
| | Flow (ml./min.) | 12.5 | 25 |
| Stripper Gases to Stripper | Flow air (scfh) | 20.5 | 18.5 |
| | Flow steam (pph) | 7.3 | 5.1 |
| Fluorine-laden vapor from Stripper | Temperature | 216° F. | 194° F. |
| Spent acid from Stripper | Flow (ml./min.) | 44 | 87 |
| | Sp. Gr. | 1.44 | 1.42 |
| | Temperature | 196° F. | 172° F. |
| | F | 0.28% | 0.41% |
| | $H_2SO_4$ | 42.2% | 29.4% |
| | $P_2O_5$ | 12.76% | 16.71% |
| Defluorination Achieved | | 67% | 58% |
| Defluorination | Example 1 | | 33% |
| | Example 4 | | 63% |

These examples in conjunction with previous examples 1 and 4 show the beneficial effects obtained when steam is used as a stripping gas.

EXAMPLES 7 and 8

| Stream | Variable | Values | |
|---|---|---|---|
| No. 2 Filtrate to Stripper | Temperature | 141° F. | 201° F. |
| | $P_2O_5$ | 21.68% | 25.75% |
| | Flow (ml./min.) | 125 | 125 |
| | Fluorine | 1.027% | 1.440% |
| $H_2SO_4$ to Stripper | Temperature | Ambient | Ambient |
| | $H_2SO_4$ | 99+% | 99+% |
| | Flow (ml./min.) | 61 | 44 |
| Stripper Gases to Stripper | Flow air (scfh) | 0 | 7 |
| | Flow stream (pph) | 4 | 4 |
| Fluorine-laden vapor from Stripper | Temperature | 190° F. | 190° F. |
| Spent acid from Stripper | Flow (ml.min.) | 189 | 163 |
| | Sp. Gr. | 1.420 | 1.45 |
| | Temperature | 190° F. | 193° F. |
| | F | 0.286% | .219% |
| | $H_2SO_4$ | 37.32% | 34.27% |
| | $P_2O_5$ | 13.78% | 16.87% |
| Silica to Stripper | $H_2SiO_3$ (g./min.) | 0 | 0.93 |
| Defluorination Achieved | | 56% | 77% |

The effect of the addition of acid-soluble silica to the stripper on the defluorination is demonstrated in the above examples.

EXAMPLES 9 and 10

| Stream | Variable | Values | |
|---|---|---|---|

| | | | |
|---|---|---|---|
| No. 2 Filtrate to Stripper | Temperature | 160° F. | 140° F. |
| | $P_2O_5$ | 11.60% | 16.47% |
| | Flow (ml./min.) | 125 | 125 |
| | Fluorine | 1.252% | 1.176% |
| | Fluorine added by solids | 0.186% | 0 |
| $H_2SO_4$ to Stripper | Temperature | Ambient | Ambient |
| | $H_2SO_4$ | 99+% | 99+% |
| Stripping Gases to Stripper | Flow air (scfh) | 6 | 0 |
| | Flow steam (pph) | 4 | 4 |
| Fluorine laden vapor from Stripper | Temperature | 204° F. | 212° F. |
| Spent acid from Stripper | Flow (ml./min.) | 170 | 170 |
| | Sp. Gr. | 1.34 | 1.30 |
| | Temperature | 192° F. | 190° F. |
| | F | 0.634% | 0.504% |
| | $H_2SO_4$ | 30.86% | 29.91% |
| | $P_2O_5$ | 11.60% | 9.79% |
| Defluorination Achieved | | 28% | 27% |

The above examples are principally of interest for the effect of adding fluorine containing solids to the No. 2 Filtrate, on the percentage of defluorination.

In reporting the various reaction conditions and results obtained in the above examples, the following abbreviations have been used:

| | |
|---|---|
| ml./min. | = milliliters per minute |
| scfh | = standard cubic feet per hour |
| pph | = pounds per hour |
| g./min. | = grams per minute |
| Sp. Gr. | = Specific Gravity |

All percentage compositions are expressed as percentages by weight, and the percentage compositions of the various streams described are based upon the total weight of the stream. The percentage defluorination achieved is based on the original fluorine content of the No. 2 Filtrate, i.e., the dilute phosphoric acid wash solution.

Since the major steps and conditions of the subject process have been discussed above, only in regard to the most essential features and conditions, these and other essential factors will be discussed in more detail.

Considering the step of the acidification of the dilute phosphoric acid wash solution, unless the basic nature of the wet-process is changed, there are two limiting factors to be considered. The first of these factors is that a certain constant amount of the fluoride containing acid wash solution will be obtained, and the second is that a constant amount of concentrated sulfuric acid will be available and needed to initiate the overall process and react with the charge of phosphate ore. While it is known in the prior art that acidification of fluoride containing dilute phosphoric acid solutions will liberate the fluoride values, the amounts of acid needed to effectively defluorinate the phosphoric solutions are prohibitive when applied to a commercial operation, i.e., more acid is needed for the defluorination step than can be consumed by the phosphoric acid process. In a similar manner, while it might be possible to operate with either a smaller amount of wash solution, either by using less washing of the filtrate or by concentrating the solution, this is not practical in commercial operations. Thus, operating with less washing solution would lower the efficiency of the phosphate recovery, and concentration of the wash solution would add an additional improductive step to the process.

In view of the unexpected critical relationship between the amount of fluorine recovery and the concentration of sulfuric acid in the mixed acids, as shown in FIG. 2, an efficient process on a commercial scale is possible. Thus, as shown herein, within the range of from about 32 to 45 percent there is a very sharp increase in the amount of fluorine recovery, with a maximum recovery being in the range of 35 to 40.5 percent.

In accordance with this relationship the total amount of sulfuric acid to be used in the phosphoric acid process is first diverted to the defluorination unit, wherein it is mixed under the proper conditions with a sufficient amount of the dilute phosphoric acid wash solution to provide the proper concentration in the defluorination unit. That portion of the wash solution not used in the defluorination unit is returned directly to the phosphoric acid process.

Since as is discussed below the volatilization of fluorides from the mixture of acids is dependent upon the temperature of the mixture and increased temperatures give off an increased amount of fluoride, it is desirable to have the temperature of the two acids within certain temperature ranges prior to mixing. Thus, it is preferred to have the temperature of the dilute phosphoric acid solution within the range of from about 130° F. to 220° F. prior to mixing. Also, it is preferred to have the temperature of the sulfuric acid used in the range of from about 70° F. (ambient) to 200° F. Due to the relationship between the temperature of the mixture of acids and the volatilization of fluoride, it is preferred that the two streams, i.e., the wash solution stream and the sulfuric acid stream be mixed directly in the stripping portion of the process, whereby the heat of dilution may be utilized to further increase the temperature of the mixture.

Another factor influencing the amount of fluorine that may be stripped from the mixture of acids is the addition of an acid-soluble silica to the mixture. The effect of this addition is shown above in examples 7 and 8. Suitable acid soluble silicas which may be added include finely divided silicic acid, powdered silica and silicic acid salts. It is postulated that the acid soluble silica added at this point reacts with the residual HF in the mixed acids, producing $H_2SiF_6$ and $SiF_4$, which are more readily stripped than HF, and thereby will increase the defluorination. In general, the preferred amount of silica added amounts to 100 percent to 200 percent of the stoichiometric amount needed to convert the HF present in the mixed acids to $SiF_4$. However, lower additions will produce increased fluoride yields at lower efficiencies.

Although not directly related to improving the efficiency of stripping the fluoride values from the wash solution, but a method which may be used in conjunction with this process for incremental fluoride production, is the addition of impure fluorides or fluosilicates to the mixture of acids. The effect of such an addition is shown above in examples 9 and 10. Examples of such materials which may be added include calcium, potassium, and sodium fluosilicate, impure silicofluorides materials associated with the phosphoric acid process, such as phosphoric acid reactor scale, and solids produced in the concentration of dilute wet-process phosphoric acid. Waste fluoride materials and ores, such as sodium fluoride, potassium fluoride, calcium fluoride, magnesium fluoride, and impure fluoride acids, such as hydrofluoric and fluosilicic, may, also, be added. With the addition of these fluoride materials, an acid-soluble silica should also be added to improve the efficiency of stripping. In general, the amount of impure fluoride materials added will range from 0.1 to 10 weight percent of the mixture of acids.

In the second main step of this process, wherein the volatile fluorides are stripped from the hot mixture of acids, any suitable type of stripping column may be utilized, provided it provides for sufficient mixing of the acids and stripping gas, and the apparatus will function within the desired temperature range.

The temperature of the mixed acid at which the stripping is effected is important, and, in general, elevated temperatures up to the boiling point of the mixed acids are preferred. The preferred range of temperatures for the mixture of acids during the stripping operation is from about 130° F. to 240° F., with temperatures above 220° F. being highly preferred. However, it may not be possible to use these high temperatures due to the very corrosive nature of the acids on the materials of construction.

To more economically obtain the desired stripper operating temperatures, preheating of the separate acid feed streams is used. This further has the advantage of reducing the scaling of the heat transfer equipment, in that the mixed acids are much more corrosive than the separate acids. The heat of dilution of the sulfuric acid with the dilute phosphoric acid solution is an important source of heat, and should be utilized by mixing of the two acid streams immediately prior to stripping. The method of mixing these streams must be such that a thorough mixing must be effected immediately to prevent localized overheating caused by high sulfuric acid concentrations within the stripping column, which would damage tower components.

In general, it has been found that air will strip the fluorides released primarily by the decomposition of the fluosilicates with acidification, whereas steam will strip these fluorides, plus an additional amount of fluoride from the mixture of acids. As discussed above in conjunction with FIG. 3, the results of steam stripping a dilute acidified phosphoric acid solution were unexpected in view of the prior art.

It is known from the prior art that in the defluorination of phosphoric acid solutions, the nature of the chemical changes are quite complex. These fluoride-containing phosphoric acid solutions contain mixtures in ionic equilibrium of fluoride compounds such as $H_xF_x$, $H_2SiF_6$, $Na_2SiF_6$, $K_2SiF_6$, $AlF_3$, and probably other fluoride radicals $F^1$ and $SiF_6^=$. In solutions containing low $P_2O_5$ concentrations, i.e., 30 percent and below, little, if any, fluoride can normally be steam stripped from the solution, see for example Curve A of FIG. 3. In more concentrated fluoride containing phosphoric acid solutions, i.e., about 40% $P_2O_5$, the fluosilicate ion decomposes with steam stripping to liberate silicon tetrafluoride vapors, and at concentration of about 50% $P_2O_5$, nearly all of the fluosilicate ion is flashed off in concentration and steam stripping and some hydrogen fluoride is liberated.

As FIG. 3 and the working examples given above indicate, the use of steam in the stripping gas will actually effect an increase in the degree of defluorination of two times or more, as compared to stripping with air alone. Thus, in one situation, the fluorine removal from the initial filtrate was increased from 35 percent to 70 percent, by the use of steam as a stripping gas. On the basis of the above results, it is postulated that air-stripping of the mixed acids predominately removes the fluoride as silicon tetrafluoride vapors, whereas with steam-stripping the fluoride is stripped not only as silicon tetrafluoride, but also more of the hydrofluoric acid is stripped from the solution.

In the operation of the stripping column using air as the primary stripping gas, it has been found that the amount of air necessary to effectively release the fluoride vapors will depend upon the degree of dispersion of the gas phase. Thus, depending upon the design of the system, gas to liquid mass flow ratios in the range of 0.05:1 to about 1:1 are effective in producing good stripping. Very high gas flow ratios may make a minor increase in the degree of defluorination obtained, due, apparently to the evaporation of vapors from the mixed acids into the gas phase.

With the addition to or substitution of steam for air as the stripping gas, the degree of defluorination is more dependent upon the amount of steam used for stripping. When steam is used as the stripping gas, it appears that a definite vapor-liquid equilibrium is established in the stripping tower. The rate of steam will vary in the range of gas to liquid ratios 0.02:1 to 4:1, with 25 percentage of steam to air, up to a range of 0.05:1 to 2:1 with 100 percent steam.

The quantity of steam required to maximize the fluoride yield by stripping will probably be economically unattractive on a once-through-steam system. Therefore, it may be desirable to provide for recirculation of the steam from the top of the absorber to the bottom of the stripping column, and further to utilize a stripping column with a high number of contact stages or theoretical plates, whereby the amount of steam required is minimized. The exact degree of steam recirculation will depend upon the fluorine yield requirements and the relationship of steam cost vs. equipment costs.

The third major step of the process is the fluorine recovery reaction, wherein the volatile fluorides are absorbed from the stripping gases. This section comprises two principal units, an absorption unit to recover the majority of the fluorine values, and scrubber unit to prevent atmospheric pollution and recover additional fluorine values. In this section a variety of absorbing media may be used, as well as absorption and scrubbing apparatus.

Prior to the absorption step, it has been found that the temperature of the vapor lines between the stripping tower and the absorption section should be such as to prevent any significant drop in the temperature of the fluoride-laden vapors. This is necessary to prevent condensation of these vapors in the lines, and the subsequent scaling of the lines with silica. Thus, depending upon the exact operating characteristics, heating of the line carrying the vapors may be required.

The design of the absorption section must be such that crystallization of silica from the silicon tetrafluoride will occur in the absorbing liquid rather than on the exposed surfaces of the operating equipment. Such control of the crystallization of the silica in the absorbing liquid is conveniently accomplished by providing for a very rapid wetting of the entering gas by the absorbing liquid, whereby the highly soluble silicon tetrafluoride is rapidly stripped from the gas. This rapid wetting of the gas is effected by injecting the gas into a turbulent zone of absorbing mediums, i.e., fluosilicic acid solution, and then further dispersing the gas through a packed tower operating under near flooded conditions. A series of spray nozzles can be mounted above the tower packing to spray absorbing medium into the tower and further improve the absorption efficiency.

It has also been found that an additional aid in promoting the growth of silica crystals in the absorbing liquid, as opposed to the growth on the equipment, is to incorporate a small amount of silica slurry in the absorbing solution.

The operating temperature of the absorption tower should be as low as possible while still being consistent with the other operating variables of the process to produce product acid with a high fluoride content. In general, the operating temperatures of the absorption tower will be in the range of from ambient to 220° F., preferably from 160° F. to 210° F.

In order to provide maximum overall efficiency some of the steam vapor from the stripping column should be condensed in the absorber to serve as absorber solution makeup. This is best accomplished by recirculating the absorber fluid and cooling it in an external heat exchanger. To improve the characteristics of the stored product, such as reduction of corrosion and fluorine volatization loss, it may be advisable to further utilize the heat exchange for product cooling.

In situations where the vapors from the absorber are recycled, it is necessary to return to the stripper a vapor mixture with a low as fluorine content as possible. In such circumstances, it may be advisable to use a moderate vacuum to reduce the boiling point of the absorber liquid.

The scrubber section will operate at the boiling temperature of its liquor and will condense or evaporate only that amount of water that is dictated by the steam thermodynamics. The solution from the scrubber will be used as make up for the absorber. This solution will contain a very low concentration of fluoride, in order that the scrubber will operate at a high scrubbing efficiency.

We claim:
1. In a process for the preparation of phosphoric acid by the wet-precess wherein a phosphate ore having fluoride impurities associated therewith, is reacted with sulfuric acid to produce phosphoric acid and calcium sulfate, the precipitated calcium sulfate byproduct is washed with an aqueous washing liquor to remove adhering phosphoric acid, and the so ob- tained dilute phosphoric acid wash solution is returned to the reactor-digestor system of the process, the improvement of defluorinating the wash solution which comprises the step of a. mixing the strong reactant sulfuric acid prior to its introduction into the reactor-digestor system with a sufficient amount of dilute phosphoric acid wash solution to provide a mixture of wash solution and sulfuric acid having a sulfuric acid concentration in the range of from 29 to 45 weight percent, b. passing a gas selected from the group consisting of air, steam, or mixtures thereof having a gas to liquid mass flow ratio in the range of from 0.02:1 to 4:4 through the mixture formed in step (a) at a temperature in the range of 130° F. to 240° F. to strip the so-formed volatile fluoride compounds from the mixture, c. absorbing the volatilized fluorides formed in step (b) in an absorbing medium at a temperature in the range of ambient to 220° F.; and d. introducing the fluoride stripped acidic mixture formed in step (b) into the reactor-digestor system of the phosphoric acid process.

2. The process of claim 1, wherein the concentration of sulfuric acid in the acidic mixture of step (a) is in the range of from 31 to 40.5 weight percent.

3. The process of claim 1, wherein the stripping gas of step (b) is passed through the mixture at a gas flow to liquid flow mass ratio of from 0.05:1 to 2:1.

4. The process of claim 1, wherein the absorbing medium of step (c) is an aqueous solution of fluosilicic acid having a concentration in the range of up to 25 weight percent.

5. The process of claim 1, wherein waste impure fluoride containing solids are added to the mixture of acids in step (a) in an amount of from 0.1 to 10 weight percent of the mixture, whereby recovery of fluoride values is effected by the incremental production of fluoride vapors.

6. The process of claim 1, wherein an acid soluble silica is added to the mixture of sulfuric acid and phosphoric acid wash solution in an amount of up to 200 percent of the stoichiometric amount necessary to convert the hydrogen fluoride present to silicon tetrafluoride.

7. In a process for the preparation of phosphoric acid by the wet-process, wherein a phosphate ore having fluoride impurities associated therewith is reacted with sulfuric acid to produce phosphoric acid and calcium sulfate, the calcium sulfate byproduct is washed with an aqueous washing liquor to remove adhering phosphoric acid, and the so obtained dilute phosphoric acid wash solution is returned to the reactor-digestor system of the process, the improvement of defluorinating the wash solution which comprises the steps of a. mixing the strong reactant sulfuric acid prior to its introduction into the reactor-digestor system with a sufficient amount of the dilute phosphoric acid wash solution to provide a mixture of the wash solution and sulfuric acid having a sulfuric acid concentration in the range of from 31 to 40.5 weight percent, b. passing a gas consisting essentially of steam at a gas flow to liquid flow mass ratio of 0.02:1 to 4:1 through the mixture formed in step (a) heated to a temperature in the range of from 180° F. to 500° F. to strip the so-formed volatile fluoride compounds from the mixture, c. absorbing the volatilized fluorides formed in step (b) in a turbulent zone of absorbing medium consisting essentially of an aqueous fluosilicic acid solution having a concentration in the range of up to 25 weight percent at a temperature in the range of from 125° F. to 240° F., and d. introducing the fluoride stripped acidic mixture formed in step (b) into the reactor-digestor system of the phosphoric acid process.

8. The process of claim 7, wherein an acid soluble silica is added to the mixture of sulfuric acid and phosphoric acid wash solution in an amount up to 200 percent of the stoichiometric amount necessary to convert the hydrogen fluoride present to silicon tetrafluoride.